(12) United States Patent
Hunter, Jr.

(10) Patent No.: US 6,584,761 B2
(45) Date of Patent: Jul. 1, 2003

(54) MAPP GAS FUEL FOR FLIGHT VEHICLES HAVING PULSE DETONATION ENGINES AND METHOD OF USE

(75) Inventor: Louis G. Hunter, Jr., Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 10 days.

(21) Appl. No.: 09/738,935

(22) Filed: Dec. 15, 2000

(65) Prior Publication Data

US 2003/0029161 A1 Feb. 13, 2003

(51) Int. Cl.[7] .................................................. F02K 7/02
(52) U.S. Cl. ........................................... 60/204; 60/247
(58) Field of Search ................ 60/204, 247; 123/46 SC; 227/10

(56) References Cited

U.S. PATENT DOCUMENTS

| | | | |
|---|---|---|---|
| 4,372,753 A | | 2/1983 | Narasimhan, Jr. et al. |
| RE32,452 E | * | 7/1987 | Nikolich ................ 123/46 SC |
| 4,811,556 A | | 3/1989 | Lau et al. |
| 4,817,890 A | | 4/1989 | Coffinberry |
| 4,835,959 A | | 6/1989 | Coffinberry |
| 4,840,025 A | | 6/1989 | Coffinberry |
| 4,841,723 A | | 6/1989 | Lau et al. |
| 5,000,128 A | * | 3/1991 | Veldman ................ 123/46 SC |
| 5,103,637 A | | 4/1992 | Itoh et al. |
| 5,473,885 A | | 12/1995 | Hunter, Jr. et al. |
| 5,513,489 A | | 5/1996 | Bussing |
| 5,546,744 A | | 8/1996 | Winfree et al. |
| 5,557,926 A | | 9/1996 | Hunter, Jr. et al. |
| 5,579,633 A | | 12/1996 | Hunter, Jr. et al. |
| 5,615,548 A | | 4/1997 | Winfree et al. |
| 5,672,184 A | | 9/1997 | Hunter, Jr. |
| 5,705,771 A | | 1/1998 | Flynn et al. |
| 5,752,643 A | * | 5/1998 | MacVicar et al. ............ 227/10 |
| 5,842,623 A | * | 12/1998 | Dippold ........................ 227/10 |
| 5,873,240 A | | 2/1999 | Bussing et al. |
| 5,937,635 A | | 8/1999 | Winfree et al. |
| 6,076,487 A | | 6/2000 | Wulff et al. |
| 6,101,808 A | | 8/2000 | Knuth et al. |
| 6,349,538 B1 | * | 2/2002 | Hunter et al. .................. 60/204 |

* cited by examiner

Primary Examiner—Michael Koczo
(74) Attorney, Agent, or Firm—Bracewell & Patterson, L.L.P.

(57) ABSTRACT

A fuel containing methylacetylene-propadiene, commonly referred to as MAPP gas, produces thrust in a flight vehicle having a pulse detonation engine. The MAPP gas fuel of this invention may be used alone or combined with other conventional fuels such as hydrogen, JP-4, JP-5, JP-10, kerosene or any other suitable hydrocarbon fuel. Such hydrocarbon containing fuel includes, but is not limited to, acetylene, methane, ethylene, propane, butane or liquified petroleum gas. MAPP gas fuel is mixed with an oxidant containing oxygen or air and ignited. The detonation wave created produces thrust for the flight vehicle. A method of powering a flight vehicle having a pulse detonation engine with MAPP gas fuel is also disclosed.

9 Claims, 3 Drawing Sheets

MAPP GAS FUEL FOR FLIGHT VEHICLES HAVING PULSE DETONATION ENGINES AND METHOD OF USE

BACKGROUND OF THE INVENTION

1. Field of the Invention

This invention relates in general to propulsion systems, and in particular to fuels for pulse detonation engines that may be used for flight vehicles.

2. Description of Related Art

A pulse detonation engine (PDE) is an apparatus which produces a high temperature and high pressure exhaust gas from a series of repetitive detonations within a detonation chamber to generate thrust at supersonic speeds for flight vehicles, such as aircraft, missile or spacecraft. At high speeds, such as Mach 2 to about Mach 3.5, a PDE would theoretically be more efficient than conventional turbojets because such engine does not require compressors or turbines. As a result, a PDE would theoretically weigh less that a conventional gas turbine engine that supplies an equivalent amount of thrust.

In a PDE, a highly explosive fuel is mixed with an oxidant and ignited to create an initial detonation wave. The detonation shock releases substantial amounts of heat and energy that compresses the gas mixture, thereby increasing its pressure, density and temperature. As the wave propagates toward an open rearward end of the detonation chamber, thrust is produced. The detonation chamber is purged of the detonation or exhaust gases and the cycle is then repeated.

Heretofore, the highly explosive fuels employed in a PDE are conventional gases, such as hydrogen or propane, or conventional atomized aircraft fuels, such as JP-10. When such conventional fuels are used, oxygen is often required as an oxidant to create an initial detonation wave shortly after ignition. For many of the conventional fuels used in present pulse detonation engines, it has not been possible to create a detonation wave with air only. When the spark is ignited, the detonation wave does not immediately form, but takes several inches or feet before the detonation wave forms. That distance is known as the transition length. The safest application to minimize the transition length is MAPP gas. If the transition length is minimized using MAPP gas and either air or oxygen, thrust is maximized. There is a need for a PDE fuel which may create an initial detonation wave with air alone.

BRIEF SUMMARY OF THE INVENTION

It has been discovered that a highly energetic liquid hydrocarbon mixture which contains methylacetylene-propadiene, commonly referred to as MAPP gas (hereinafter referred to as MAPP gas), meets this need.

The MAPP gas fuel of this invention contains methylacetylene-propadiene. The MAPP gas fuel may be used alone as a fuel for a pulse detonation engine or it may be combined with other conventional fuels such as hydrogen, JP-4, JP-5, JP-10, kerosene or a hydrocarbon containing fuel. Such hydrocarbon containing fuel includes, but is not limited to, acetylene, methane, ethylene, propane, butane or liquified petroleum gas.

This invention also includes a method of powering a flight vehicle having a pulse detonation engine which includes the following steps: supplying a MAPP gas fuel and an oxidant to a detonation chamber of a pulse detonation engine to form a detonable mixture; and igniting the detonable mixture in the detonation chamber to create a propagating detonation wave of detonation or exhaust gases in the chamber. The method also includes purging the detonation or exhaust gases from the detonation chamber, then repeating these steps.

In a preferred embodiment of this invention, a flight vehicle having a pulse detonation engine includes the following: a tank of MAPP gas fuel; a source of oxidant; a detonation chamber in fluid communication with the tank of MAPP gas fuel and the oxidant source, the chamber structured to propagate a detonable wave of gases when a mixture of MAPP gas fuel and oxidant is ignited; and an ignitor in communication with the detonation chamber for igniting the detonable mixture.

DETAILED DESCRIPTION OF PREFERRED EMBODIMENT

MAPP gas is a stable, high energy fuel that heretofore is well known for use in heating, brazing, soldering, metallizing, flame cutting, flame-hardening or treating metals. MAPP gas contains mostly methylacetylene-propadiene and may contain liquified petroleum gas. MAPP gas is available commercially from compressed gas producers such as Corp. Brothers, Inc. and other suppliers. Heretofore, MAPP gas has not been used or considered as a fuel for flight vehicles which are powered by PDEs.

MAPP gas may be used as a fuel in a PDE because a detonation wave is formed much faster when mixed with an oxidant, such as oxygen or air, and ignited by a high energy spark, laser or some other appropriate ignition system. MAPP gas also ignites much faster when mixed with air as compared to conventional fuels such as hydrogen or propane. Conventional PDE fuels often require oxygen to create detonation waves. This may be due to the superior thrust calculation for MAPP gas as compared to other conventional PDE fuels.

MAPP gas may be stored as a liquid at its vapor pressure of 97 psi at 70 degrees F. The density of MAPP gas is about 4.8 pounds per gallon, but when supplied to a PDE it is introduced as a gas. Conventional PDE liquid fuels, such as JP-10, on the other hand, are supplied or sprayed into a PDE as a fine liquid mist and then mixed with oxygen. The fact that MAPP gas is introduced into a PDE as a gas may also be responsible for the faster detonation observed in the presence of air and the increased thrust produced as compared to conventional fuels.

Figure 1:
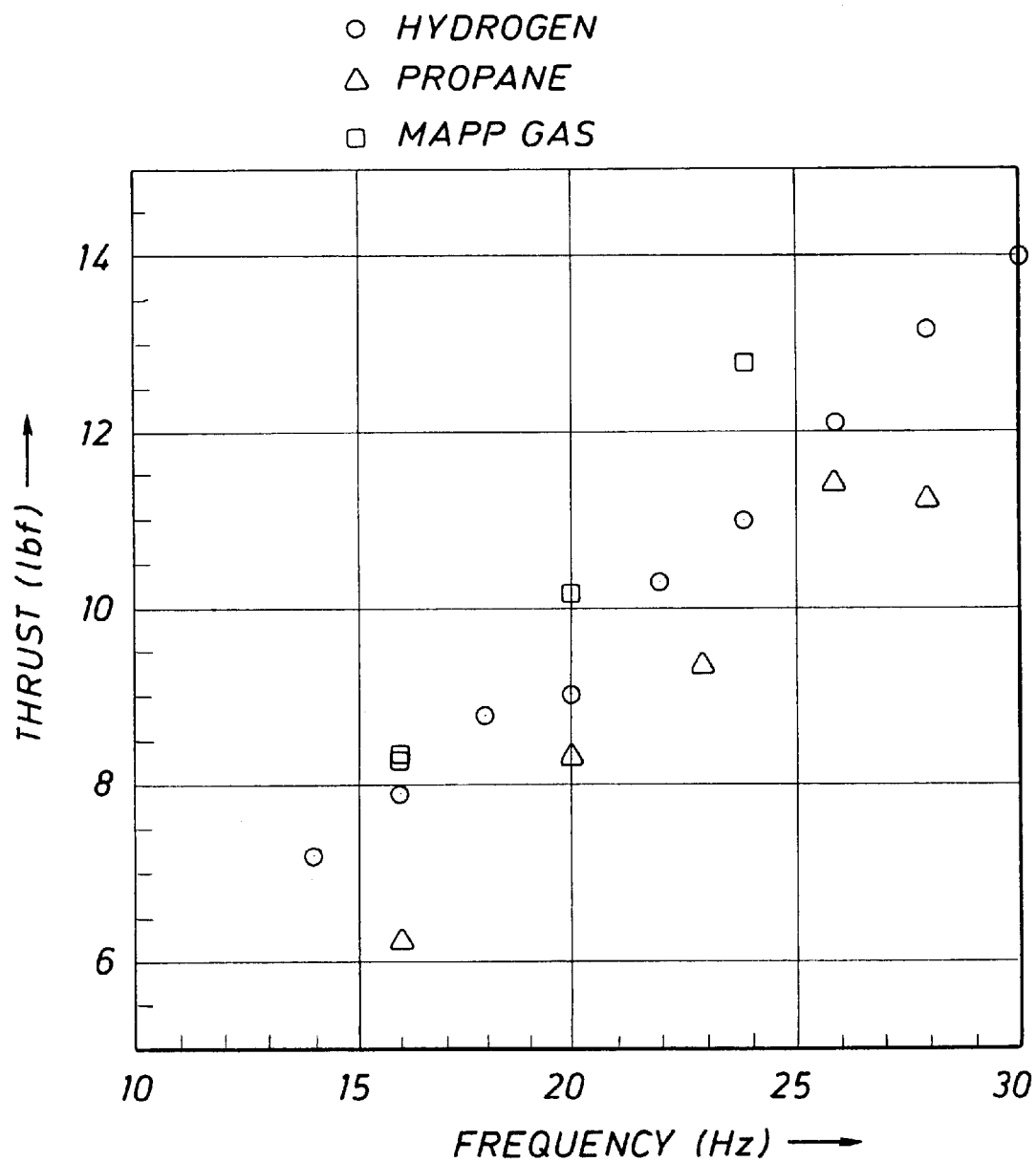
FIG. 1 is a plot of thrust of a PDE against frequency.

It has been discovered that a PDE utilizing MAPP gas fuel has been shown to produce greater thrust than other conventional liquid fuels. Referring now to FIG. 1, the thrust generated as a function of wave frequency is shown for PDE fuels. At all wave frequencies tested, MAPP gas fuel was shown to generate greater thrust than either hydrogen or propane using air a the oxidizer.

When MAPP gas fuel is supplied concomitantly with conventional fuels for flight vehicles similar increases in thrust are anticipated. Conventional fuels include JP-4, JP-5, JP-10, kerosene or any other suitable hydrocarbon fuels.

Hydrocarbon containing fuels that may be suitable with MAPP gas include, but are not limited to, acetylene, methane, ethylene, propane, butane or liquified petroleum gas. Such hydrocarbon containing fuels may be supplied as a gas or a compressed liquid. As discussed herein, the term "fuel" includes liquid and/or gaseous fuels and mixtures thereof. The term "oxidant" includes a mixture of oxidants, including oxygen and/or air.

Figure 2:
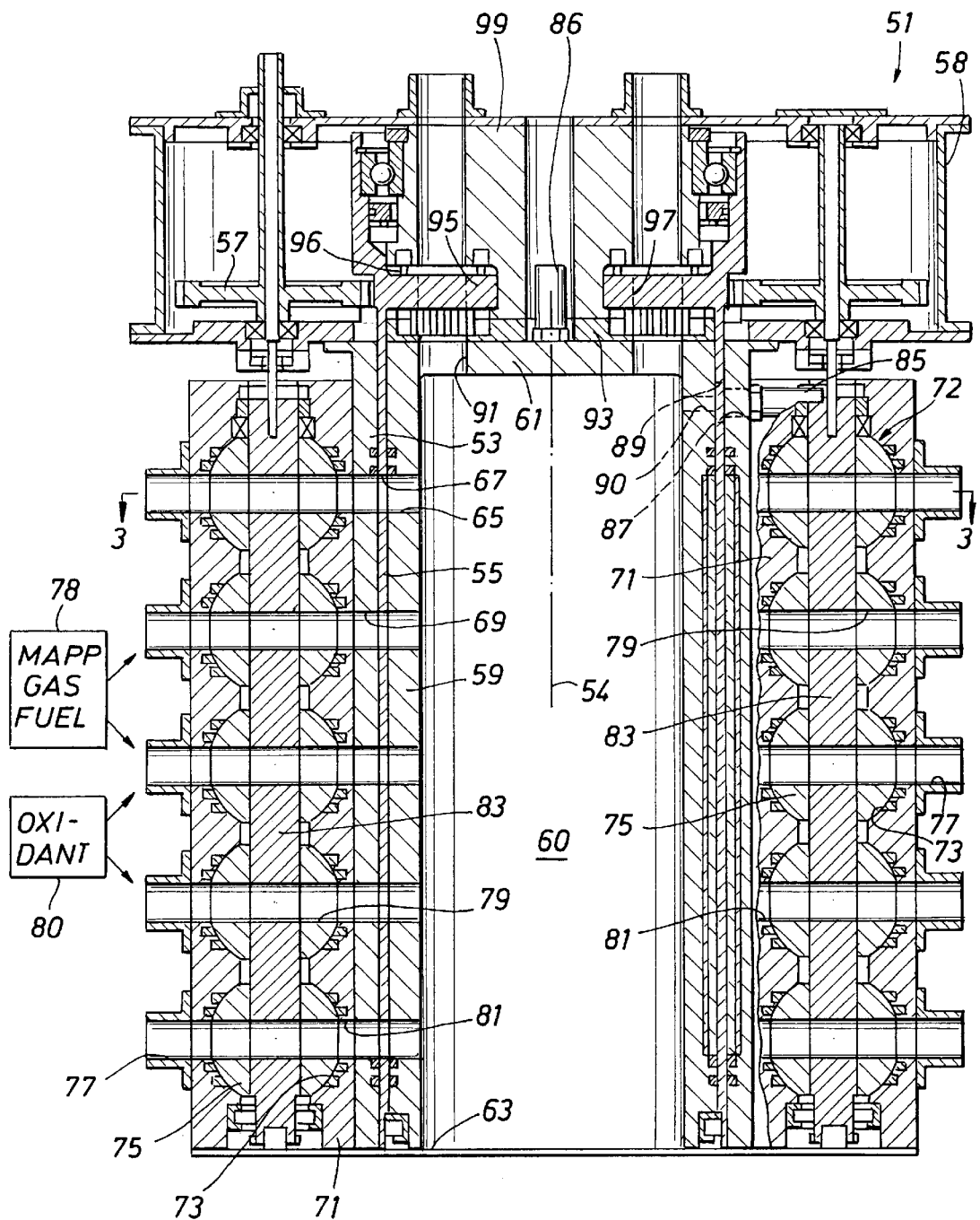
FIG. 2 is a cross-sectional view illustrating an embodiment of a pulse detonation engine that may use MAPP gas fuel.
Figure 3:
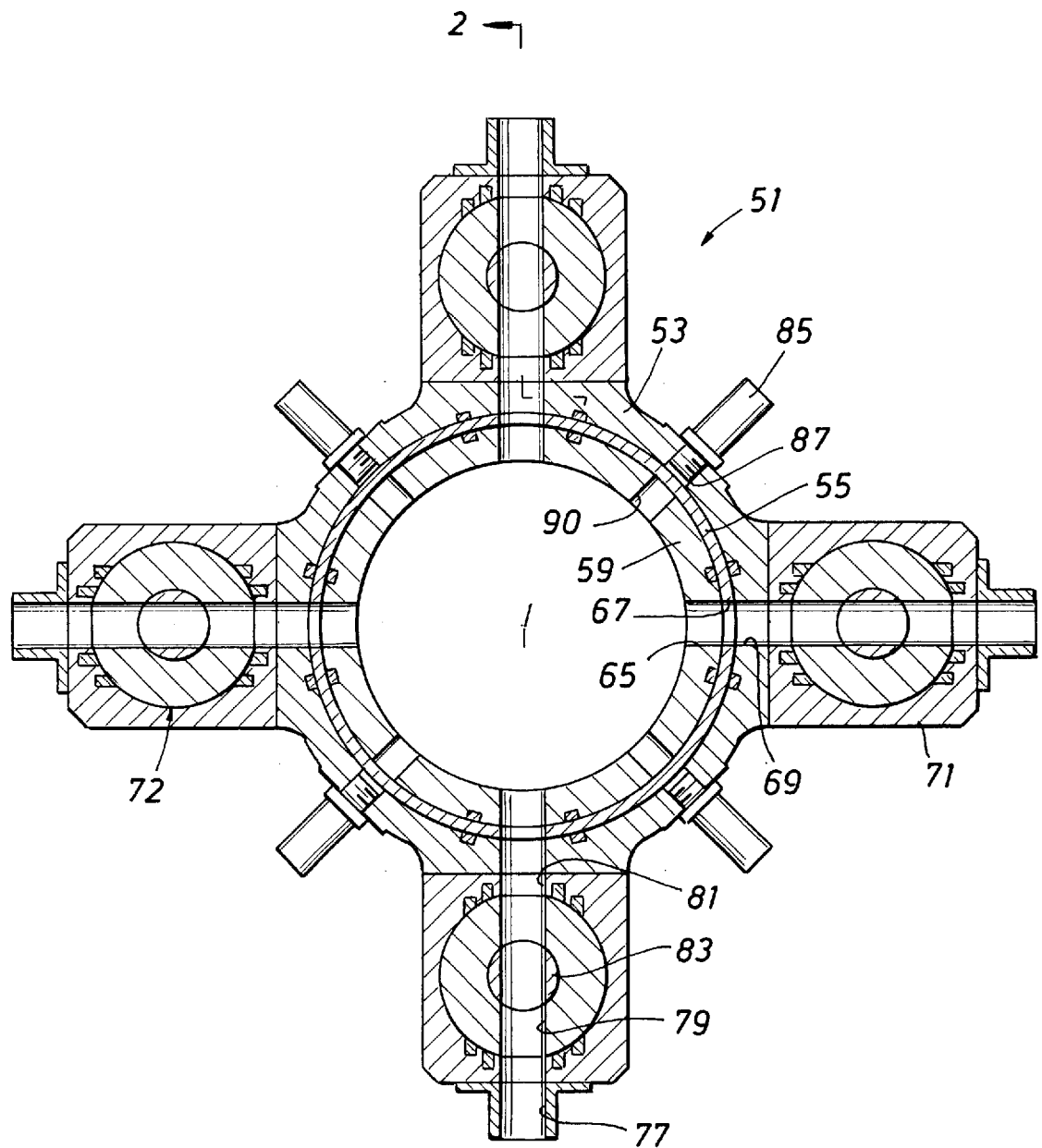
FIG. 3 is a sectional view of the pulse detonation engine of FIG. 2, taken along the line III—III of FIG. 2.

Referring now to FIGS. 2 and 3, a pulse detonation engine 51 is illustrated. Although many different variations of a pulse detonation engine could be used in the present invention, pulse detonation engine 51 represents one type to use in the combination described herein. Pulse detonation engine 51 has a tubular cylinder or housing 53. Housing 53 has a bore with a longitudinal axis 54. A valve sleeve 55 is rotatably carried in the bore of housing 53, concentric with axis 54. Valve sleeve 55 is also a cylinder, having its exterior closely received within housing 53. A gear train 57 located within a gear case 58 will be connected to an external drive source for rotating valve sleeve 55 relative to the stationary housing 53. The external drive source may be powered by gas turbine engine 13 or other suitable means.

A cylindrical liner 59 is stationarily mounted within the inner diameter of sleeve 55. Liner 59 is secured by fasteners (not shown) to the gear case 58. The bore or interior of liner 59 serves as a detonation chamber 60. Liner 59 is made of a material that withstands high temperatures and has sufficient strength to withstand the high pressures created. Liner 59 has a upstream end wall 61 which forms the upstream end wall of detonation chamber 60. Liner 59 has an open downstream end 63 through which pulse detonation waves discharge.

Liner 59 has a plurality of liner ports 65 extending through its sidewall. As show in FIG. 3, there are four sets of liner ports 65, each set spaced 90 degrees apart from each other. As shown in FIG. 2, each set has five liner ports 59 evenly spaced apart from each other along longitudinal axis 54. Valve sleeve 55 has a plurality of valve sleeve ports 67 which are spaced in the same manner as liner ports 65. There are four radially spaced sets of valve sleeve ports 67, each set having five ports 67 spaced along longitudinal axis 54. Similarly, housing 53 has a port 69 radially aligned with each of the liner ports 65. As gear train 57 rotates valve sleeve 55, valve sleeve ports 67 will align with liner ports 65 and housing ports 69 four times per revolution.

Four manifolds 71 are mounted to the exterior of housing 53. Manifolds 71 are spaced 90 degrees apart from each other, as shown in FIG. 3. Each manifold 71 has five outer valves 72, each of which corresponds to one of the liner ports 65 and housing ports 69. Each of the outer valves 72 has a concave seat 73 which may be generally spherical or elliptical. A mating convex valve element 75 is rotatably carried within each seat 73. Manifold 71 has a manifold inlet port 77 that is located on a radial line with one of the housing ports 69 and liner ports 65. Valve element 75 has a valve passage 79 which extends through valve element 75 perpendicular to longitudinal axis 54. Manifold 71 has a manifold outlet port 81 for each of the valve inlet ports 77, the outlet ports 81 being radially aligned with one of the manifold inlet ports 77.

As the valve element 75 rotates, valve passage 79 will align and communicate manifold inlet port 77 with manifold outlet port 81 twice per revolution. An outer valve drive means includes a shaft 83 which extends parallel to longitudinal axis 54. Shaft 83 extends through each of the valve elements 75 and is rigidly secured to the valve elements 75 for rotating. Shaft 83 is driven by drive train 57. The rotation speed of shaft 83 is synchronized with the rotation speed of valve sleeve 55 so that valve passage 79 will open the manifold ports 77, 81 simultaneously with the opening of the liner ports 65 and housing ports 69. In the drawings, the ports 65, 69, 77, and 81 are shown in the open position.

The manifold inlet ports 77 are connected to sources or tanks 78 and 80 of MAPP gas fuel and an oxidant that are preferably stored as a liquid. The fuel may be MAPP gas fuel alone or MAPP gas fuel that is combined with one or more other suitable fuels such as JP-4, JP-5, JP-10 or kerosene. MAPP gas fuel may also be mixed with other fuels such as hydrogen, acetylene, methane, ethylene, propane or butane. Preferably, one or more fuels and oxidants may be supplied separately to manifold inlet ports 77. Also, one or more such fuels may be mixed prior to being supplied to manifold inlet ports 77. The oxidant may be pure oxygen, air, a mixture containing oxygen and air or other suitable oxidant with is capable of forming a detonable mixture with the fuel. Preferably, one or more oxidants may be supplied separately to manifold inlet ports 77. Also, one or more oxidants may be mixed prior to being supplied to manifold inlet ports 77. Preferably, each manifold inlet port 77 which is supplied with MAPP gas fuel or fuel mixture will be spaced 180 degrees apart from a manifold inlet port 77 supplied with an oxidant or oxidant mixture. The opposed inward flows of fuel and oxidant enhance mixing. Also, the MAPP gas fuel mixture and oxidant inlets could be staggered along the axis 54. For example, the most upstream four valves 72 could be supplied with fuel at the zero and 180 degree valve locations and the oxidant at the 90 and 270 degree valve locations. The second most upstream group of four valves 72 could be supplied with the fuel at the 90 and 270 degree valve locations and the oxidant at the zero and 180 degree valve locations. Air is preferably supplied from diffuser section 23 to some of the inlet ports 77, particularly those located toward the open downstream end 63. The fuel and oxidant will flow or be supplied to the combustion chamber 60 as a liquid and form a gas where they mix for detonation.

Detonation is performed by igniters 85, 86, which may be either spark-type lasers or other high energy ignition sources. As shown in FIGS. 2 and 3, four radially oriented igniters 85 are spaced 90 degrees apart from each other near liner upstream end wall 61. Igniters 85 are contained within a single radial plane. Igniter 86 is optional and is shown axially oriented in liner upstream end wall 61 on longitudinal axis 54. If igniters 85 are lasers rather than spark-type, they will emit a beam of light through a lens 87 contained in housing 53, which focuses the beam on axis 54. Valve sleeve 55 has four igniter ports 89 which will register with lenses 87 and with igniter ports 90 in liner 59 to allow the beams to pass through four times per revolution of valve sleeve 55. Valve sleeve igniter ports 89 are positioned so that they open the path for each igniter 85 after the liner ports 65 have been closed by valve sleeve 15. Valve sleeve 55 will cover lenses 87 during the detonation phase of the cycle. Upon detonation of the mixture of MAPP gas fuel and oxidant, a detonation wave is created which propagates along detonation chamber 60 towards the open downstream end 63.

Referring again to FIG. 2, pulse detonation engine 51 has a purge means for purging the detonation chamber 60 of exhaust or detonation gases after the detonation has occurred and before the next detonation wave cycle begins. This includes a plurality of purge ports 91 located within liner upstream end wall 61. Preferably, there are at least two purge ports 91. A flame arrester 93 is mounted to each purge port 91 to reduce the possibility of any flames from flowing upstream. Valve sleeve 55 has an upstream end wall 95 which is located directly upstream from liner upstream end wall 61. Valve sleeve upstream end wall 95 is parallel to liner end wall 61 and perpendicular to longitudinal axis 54. Valve sleeve upstream wall 95 rotates with valve sleeve 55 and is sealed on both the upstream and downstream sides by spring-biased seals 96.

A plurality of valve sleeve purge ports 97 extend through valve sleeve upstream wall 95. A purge manifold 99 directs a purge field, such as air, from the upstream end of gear case 58 to the valve sleeve purge ports 97. Four times per revolution, valve sleeve purge ports 97 will open liner purge ports 91, admitting a purge fluid, which is air flowing through diffuser section 23. Valve sleeve purge ports 97 are positioned so that they will admit the purge fluid immediately after each combustion occurs and before the valve sleeve ports 67 and outer valves 72 admit the next mixture of fuel and oxydizer.

In operation, an external power source (not shown) rotates drive train 57. This rotates outer valves 72 and valve sleeve 55. MAP gas fuel or fuel mixture is supplied as a liquid to several of the manifold inlet ports 77, including some of the inlet ports 77 near the upstream end. An oxidant or oxidant mixture may be supplied to some of the other inlet ports 77, including some of the inlet ports located near the upstream end. Because the four manifolds 71 are separate, the most upstream inlet port 77 of one manifold may be receiving an oxidant, while the most upstream inlet port 77 of another manifold may be receiving a fuel mixture. Some or all of the downstream inlet ports 77 may be supplied with air from diffuser section 23.

The MAPP gas fuel and oxidant will flow into detonation chamber 60 and vaporize to a gas when manifold inlet ports 77, valve passage 79, manifold outlet ports 81, housing ports 69, valves sleeves ports 67, and liner ports 65 align. The MAPP gas fuel and oxidant mix immediately thereafter to form a detonable mixture, and liner ports 65 and valve passages 79 will close. Purge ports 911 will also be closed. The igniter ports 89 will align with igniter ports 90, causing the igniters 85 to focus on axis 54. The focusing of the igniters 85 creates a spark which ignites the detonable MAPP gas fuel and oxidant mixture in detonation chamber 60. This detonation creates a high temperature, high pressure, detonation wave which discharges out open downstream end 63, creating thrust. A reverberating expansion wave is created by the initial detonation wave. The expansion wave reflects off the upstream end wall 61 and discharges from the open downstream end 63, creating additional thrust. The closure of valve sleeve ports 67 and valve passages 79 eliminate hot products and hot metal from coming into contact with fuel or oxidant that has not yet been introduced into the combustion chamber 60.

Immediately after, but prior to liner ports 65 again opening, purge ports 91 open by alignment with the valve sleeve purge ports 97. Air supplied form diffuser section 23 through purge manifold 99 will flow into detonation chamber 60. The purge air removes hot exhaust or detonation gases and dilutes trapped reactants from detonation chamber 60. Immediately thereafter, liner ports 65 again open to repeat the process. The rotational speed of valve sleeve 55 is selected to create pulses at a rate of approximately 100 cycles per second.

The advantages of using the MAPP gas fuel of this invention over other conventional fuels are as follows: First, MAPP gas fuel may be stored as a liquid, but is introduced into a PDE as a gas. Conventional PDE fuels are either stored and introduced as either a gas or liquid. Second, MAPP gas fuel does not require oxygen to create a detonation wave upon ignition as other conventional fuels. Third, MAPP gas fuel creates greater thrust and is superior in terms of thrust to flow rate and in ISP to hydrogen, propane fuels or other conventional fuels.

It is believed that the foregoing description may be applicable to any pulse gas detonation engine. A PDE may be mounted or installed upon any suitable flight vehicle such as a aircraft, missile or spacecraft.

The foregoing description of a preferred embodiment of the invention has been presented for purposed of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

It is claimed:

1. A method of powering a flight vehicle having a pulse detonation engine, comprising:

(a) supplying a MAPP gas fuel and an oxidant to a detonation chamber of a pulse detonation engine to form a detonable mixture; and (b) igniting the detonable mixture in the detonation chamber to create a propagating detonation wave of detonation gases in the chamber.

2. The method of claim 1 further includes purging the detonation gases from the detonation chamber, then repeating steps (a) and (b).

3. The method of claim 1 wherein the MAPP gas fuel comprises methyacetylene-propadiene.

4. The method of claim 1 wherein the oxidant contains at least oxygen or air.

5. The method of claim 3 further comprising mixing the MAPP gas fuel with a second fuel selected from the group consisting of hydrogen, JP-4, JP-5, JP-10, kerosene, acetylene, methane, ethylene, propane, butane and liquid petroleum gas.

6. The method of claim 1 wherein step (a) includes flowing the MAPP gas fuel and the oxidant separately into the detonation chamber and mixing the MAPP gas fuel and oxidant while in the detonation chamber.

7. The method of claim 1 wherein step (a) comprises storing the MAPP gas fuel as a liquid in a tank and delivering the MAPP gas fuel as a gas to the detonation chamber.

8. A method of powering a flight vehicle having a pulse detonation engine, comprising:

(a) flowing a detonable mixture of a MAPP gas fuel, a second fuel, and an oxidant to a detonation chamber of a pulse detonation engine, the second fuel being selected from the group consisting of hydrogen, JP-4, JP-5, JP-10, kerosene, acetylene, methane, ethylene, propane, butane and liquid petroleum gas, the oxidant containing at least oxygen or air; and (b) detonating the detonable mixture in the chamber to create thrust for powering the engine; and (c) removing the detonation products from the chamber, then repeating steps (a) and (b).

9. A flight vehicle having a pulse detonation engine, comprising:

a tank of MAPP gas fuel;

a source of oxidant;

a detonation chamber in fluid communication with the tank of MAPP gas fuel and the oxidant source, the chamber structured to propagate a detonable wave of gases when a mixture of MAPP gas fuel and oxidant is ignited;

an igniter in communication with the detonation chamber for igniting the detonable mixture;

the MAPP gas fuel containing methyacetylene-propadiene; and a second fuel mixed with the MAPP gas fuel, the second fuel being selected from the group consisting of hydrogen, JP-4, JP-5, JP-10, kerosene, acetylene, methane, ethylene, propane, butane and liquid petroleum gas.

* * * * *